3,280,163
PRODUCTION OF MERCAPTO-SUBSTITUTED
NITRILES
Rector P. Louthan and Stanley D. Turk, Bartlesville,
Okla., assignors to Phillips Petroleum Company, a corporation of Delaware
No Drawing. Filed May 6, 1963, Ser. No. 278,401
7 Claims. (Cl. 260—465.1)

This invention relates to a process for preparing mercapto-substituted nitriles. In another aspect, it relates to an improved process for preparing 3-mercaptopropionitrile from acrylonitrile.

Organic sulfur compounds are of considerable industrial importance and processes for obtaining them in high yields by reaction of hydrogen sulfide with ethylenically unsaturated compounds are of considerable utility. Mercapto-substituted nitriles are one class of such organic sulfur compounds; for example, 3-mercaptopropionitrile can be hydrolyzed to form 3-mercaptopropionic acid, a compound which is useful in permanent wave solutions.

Various processes have been disclosed in the prior art for the preparation of mercapto-substituted nitriles, but many of these processes have proven unsatisfactory for one reason or another. The simple addition of hydrogen sulfide to unsaturated nitriles produces small yields of mercapto-substituted nitriles and a relatively larger quantity of the corresponding thioether (sulfide). If mild reaction conditions are used for the thiolation reaction, very long reaction times are required to produce even low yields of the mercapto-substituted nitrile.

We have now discovered that mercapto-substituted nitriles, having the following structure

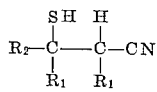

wherein $R_2$ and $R_1$ are as defined hereinbelow, can be readily produced in high yields and high purities by reaction of unsaturated nitriles with hydrogen sulfide in the presence of a catalytic amount of sulfur.

Unsaturated nitriles useful in the practice of this invention for the preparation of the corresponding mercapto-substituted nitriles can be represented by the general formula:

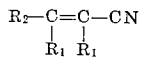

where:
  each $R_1$ is selected from the group consisting of hydrogen and lower alkyl hydrocarbon radicals which are inert under the conditions of reaction, such as methyl, ethyl, propyl and butyl radicals, and
  $R_2$ is selected from the group consisting of said $R_1$ radicals and a cyano radical (—CN).

Representative nitriles which can be used as reactants in the practice of this invention include: acrylonitrile, 2-methylacrylonitrile, 2-butenenitrile, 3-methyl-3-butenenitrile, 2,3-dimethyl-2-butenenitrile, 2-hexenenitrile, 2-heptenenitrile, 4 - methyl - 2 - hexenenitrile, 2-n-propyl-2-pentenenitrile, 3-methyl-2-pentenenitrile, 2,3-di-n-butyl-2-heptenenitrile, 2-butene-1,4-dinitrile, 2-methyl-2-butene-1,4-dinitrile, 2-ethyl-2-butene-1,4-dinitrile, 2,3-dimethyl-2 - butene - 1,4 - dinitrile, 2 - isopropyl - 3 - tert-butyl-2-butene - 1,4 - dinitrile, 2,3 - di - n - butyl - 2 - butene-1,4-dinitrile, and the like, including mixtures thereof.

In another aspect of this invention, the above-described reaction of hydrogen sulfide with unsaturated nitriles can be carried out in the presence of a catalytic amount of a weak organic base and in the presence of a catalytic amount of sulfur. Such weak organic bases have ionization constants of less than $1 \times 10^{-5}$. Representative weak organic bases which can be used in the practice of this invention include pyridine, aniline, 2-methyl-5-ethylpyridine, N-methylpyrollidone, bis(dimethylamino)-disulfide, acetamide, acetanilide, aniline, anthranilic acid, benzylamine, diethylbenzylamine, dimethylbenzylamine, ethylenediamine, para-toluidine, trimethylamine, and the like. The high-boiling condensation products prepared by reaction of ammonia and a carbonyl compound according to U.S. Patent No. 2,770,921 can also be used as bases in this invention. The use of such bases, in addition to sulfur, in the practice of this invention will produce significantly higher yields of the mercapto-substituted nitriles.

The amounts of sulfur and weak organic base, used in the practice of this invention, are, as stated above, catalytic amounts, i.e., amounts which are sufficient to catalyze the reaction and increase the yield of the mercapto-substituted nitriles. Generally, for most preparations of such products the amount of the sulfur to be used will usually be in the range of 0.1 to 5 grams per mole, preferably 0.5 to 2 grams per mole, of the unsaturated nitrile reactant charged to the reaction zone. Where an organic base is used in addition to the sulfur, the amount of such weak base which generally can be used will usually be in the range of 0.1 to 5 grams, preferably 0.5 to 2 grams per mole, of the nitrile charged to the reaction zone.

The improved reaction of this invention can be carried out in a manipulative manner like the thiolation reactions of the prior art, and can be carried out in a batch, intermittent, or continuous manner under anhydrous conditions. The reaction temperature can vary over a wide range, and generally will be in the range of 0 to 150° C., preferably 25 to 100° C. The amount of hydrogen sulfide used can vary widely, but generally will be in the range of 1 to 4 moles per mole, preferably about 2 moles per mole, of the unsaturated nitrile reactant. The reaction can be carried out in a closed system and the pressure in the reaction zone generally will be the autogenous pressure developed at the specified temperatures, such pressures being in the range of 100 to 1,000 p.s.i.g. The reaction time can also vary; generally the reaction time will be in the range of 0.1 to 20 hours, usually 0.25 to 5 hours.

The above-described reaction of hydrogen sulfide with the unsaturated nitrile compounds can be carried out in the presence of solvents or diluents, preferably polar organic diluents such as alcohols, amides, sulfoxides, sulfones and saturated nitriles. For example, diluents such as methyl alcohol, ethyl alcohol, dimethyl sulfoxide, sulfolane and acetonitrile can be used. Where such diluents are employed, the weight ratio of diluent to unsaturated nitrile reactant will generally not be greater than 3/1.

After reaction is completed to the desired degree, the mercapto-substituted nitrile products can be recovered from the reaction mixture by well-known procedures. For example, gases can be vented, recovered and recycled if desired, and the product distilled, extracted, crystallized or subjected to various other separation or recovery procedures to obtain the desired sulfur compound. In the usual recovery process, the reaction mixture will be flashed, the vaporized mercapto-substituted nitrile condensed, and the condensed product distilled to obtain the highly pure mercapto-substituted nitrile in high yields.

Of particular interest is the preparation of 3-mercaptopropionitrile. This product can be hydrolyzed to prepare the corresponding carboxylic acid, namely 3-mercaptopropionic acid, which acid is useful in permanent wave solutions.

The following examples further illustrate the objects and advantages of this invention, but it should be understood that the various reactants, amounts, temperatures, amounts, and other conditions recited in these examples should not be construed so as to limit unduly this invention.

*Example I*

A series of runs was carried out in which acrylonitrile was reacted with hydrogen sulfide in the presence or absence of sulfur and/or an organic base.

In each of these runs, 12 moles of acrylonitrile and, were used, various amounts of sulfur and/or organic base, were charged to a one-gallon stainless steel, stirred autoclave equipped with an internal steam coil and water jacket for maintaining the reaction temperature at the desired level. The reactor was then closed and pressured with the desired amount of hydrogen sulfide, after which the reaction mixture was heated to the desired temperature and maintained at such temperature for various reaction periods. In all of the runs, except run 3, samples were withdrawn from the reaction mixture every 30 minutes and analyzed for unreacted acrylonitrile by chromatographic analysis. In each run where such analysis was made, the reaction was continued until all the acrylonitrile had been reacted. Thus, each run was carried out to completion, and the reaction time given below is the reaction time to completion. In each of the runs, the reaction mixture was blown down hot from the autoclave and the resulting 3-mercaptopropionitrile was flashed from the hot reaction mixture. The flashed product was condensed and distilled, a small amount of para-toluene sulfonic acid being charged to the kettle of the distillation column to stabilize the 3-mercaptopropionitrile and minimize its decomposition. A typical sample of the distilled 3-mercaptopropionitrile boiled at 70° C. at 5 mm. Hg absolute pressure and had a refractive index $n_D^{20}$ of 1.4866. These runs and the results obtained are summarized in Table I.

*Example II*

In this example, a run was carried out in which 3-mercaptoacrylonitrile was hydrolyzed to 3-mercaptopropionic acid. In this run, 435 gm. of the 3-mercaptopropionitrile product prepared according to run 4 of Table I and 500 cc. of concentrated hydrochloric acid were charged to a 3-necked flask, equipped with a stirrer, water condenser, thermometer, a built-in steam jacket on the lower half of the flask and a drain in the bottom. The hydrolysis reaction started upon charging both reactants to the flask, and reflux commenced at 80° C. in about 15 min. after charging. Steam was circulated through the jacket until a reaction temperature of 110° C. was reached, and cooling water was then circulated through the condenser. These conditions were maintained for about 2 hrs., after which the temperature was lowered to 98° C. The mixture was then diluted with 700 cc. of water and allowed to cool to 30° C., after which it was washed twice with ether. The organic phases were separated off and combined and ether evaporated off. The remaining organic phase was fractionally distilled to produce 474 gm. of 3-mercaptopropionic acid boiling at 130° C. at 15 mm. Hg absolute pressure and having a refractive index $n_D^{20}$ of 1.4913, the yield being 84.9% based on the 3-mercaptoacrylonitrile charged.

*Example III*

In this example, 3-mercaptopropionitrile was prepared in a continuous manner by reaction of hydrogen sulfide with acrylonitrile in the presence of catalytic amounts of sulfur and a weak organic base, viz., 2-methyl-5-ethylpyridine.

The reactor used in this continuous run was a stainless steel tube, packed with glass beads and having a hot water jacket on the outside. Separate streams of liquid hydrogen sulfide and a 3.6 wt. percent solution of 2-methyl-5-ethylpyridine in acrylonitrile were continuously pumped under pressure into the reactor. A 50 wt. percent dispersion of sulfur in mineral oil was charged to the reactor through a line having a plug valve therein

TABLE I

| Run | Mol ratio of H₂S to acrylonitrile | Amt. of S per mol of acrylonitrile, g. | Base | Amt. of base per mol of acrylonitrile, g. | Reaction temp., °C. | Reaction time, hrs. | Yield of mercapto-substituted nitrile,[1] mol percent |
|---|---|---|---|---|---|---|---|
| 1 | 2/1 | 0 | None | 0 | 85 | 2 | [2] 0. |
| 2 | 2/1 | 0.5 | do | 0 | 85 | 4 | 46.5 |
| 3 | 2/1 | 1 | do | 0 | 85 | 5 | 53.3 |
| 4 | 2/1 | 1 | do | 0 | 85 | 2 | 56.2 |
| 5 | 2/1 | 1 | do | 0 | 100 | 2 | 42.9 |
| 6 | 4/1 | 1 | do | 0 | 85 | 7 | 36.6 |
| 7 | 1/1 | 1 | do | 0 | 85 | 1 | 40.3. |
| 8 | 2/1 | 2 | do | 0 | 85 | 2 | 53.7. |
| 9 | 2/1 | 5 | do | 0 | 85 | 2 | 26.0. |
| 10 | 2/1 | 0 | Pyridine | 2 | 85 | 0.75 | 28.9. |
| 11 | 2/1 | 1 | Triethylamine | 0.5 | 85 | <0.25 | [3] Vis. prod. |
| 12 | 2/1 | 1 | Pyridine | 0.5 | 85 | 0.75 | 60.7. |
| 13 | 2/1 | 1 | do | 2 | 85 | 0.25 | 62.5. |
| 14 | 2/1 | 1 | 2-methyl-5-ethylpyridine | 2 | 85 | 0.25 | 64.2. |
| 15 | 2/1 | 1 | do | 0.5 | 85 | 0.50 | 64.5. |
| 16 | 2/1 | 2 | do | 0.5 | 85 | 0.50 | 67.2. |
| 17 | 2/1 | 1 | Aniline | 2 | 85 | 2 | 63.9. |
| 18 | 2/1 | 1 | N-methylpyrrolidone | 0.5 | 85 | 0.50 | 66.1. |
| 19 | 2/1 | 1 | Bis(dimethylamino)disulfide | 0.5 | 85 | 0.50 | 62.7. |
| 20 | 2/1 | 1 | MVP bottom polymer [4] | 2 | 85 | 0.25 | 64.8. |
| 21 | 1.3/1 | 1 | do.[4] | 2 | 15-32 | 1 | 65.1. |

[1] Yield based on acrylonitrile charged.
[2] In this control run, 82.3% of acrylonitrile was recovered unreacted. Some high-boiling material was formed, but no 3-mercaptopropionitrile was found.
[3] In this control run, using a base with an ionization constant greater than 1×10⁻⁵, the product was a viscous polymer.
[4] The base in these runs was a high-boiling distillation residue obtained upon distilling 2-methyl-5-ethylpyridine prepared from the condensation of para-aldehyde and ammonia according to U.S. Patent No. 2,770,921.

The data of Table I show that whereas reaction of hydrogen sulfide with acrylonitrile in the absence of sulfur, or in the absence of a combination of sulfur and a weak organic base, produced no or very little yield of the desired 3-mercaptopropionitrile product, surprisingly high yields of such product are obtained when sulfur or sulfur and a weak organic base are present during the reaction.

which was rotated once at the beginning of the run and thereafter once every 5 min.

The temperature of the reactor was controlled to maintain a reaction temperature of 85° C., and the reactor was operated at approximately 700 p.s.i.g. with a residence time of 15 min. After the run was started, the product effluent produced in the first 45 min. was discarded, and then three approximately equal cuts or portions of the product effluent were collected in the next 82 min. These cuts were found to be of substantially identical composition by gas-liquid chromatographic analysis. Each of the cuts, stabilized with paratoluenesulfonic acid monohydrate, were combined and distilled by heating to 100° C. at 1 mm. Hg absolute in a fractionation column. Based on the acrylonitrile charged during the 82 min. when the three cuts were collected, the amount of 3-mercaptopropionitrile recovered by distillation from the combined cuts represented a yield of 50.7 mol percent.

Various modifications and alterations of this invention will become apparent to those skilled in the art from the foregoing discussion and examples, and it should be understood that this invention is not to be limited unduly to that set forth herein for illustrative purposes.

We claim:

1. A process for preparing mercapto-substituted nitriles having the following structure:

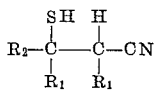

which process comprises reacting, at autogenous pressures and, between a temperature range of 0–150° C., a nitrile of a general formula:

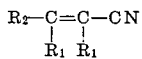

where:

each $R_1$ is selected from the group consisting of hydrogen and lower alkyl radicals, and $R_2$ is selected from the group consisting of said $R_1$ radicals and —CN said hydrogen sulfide being present in an amount of 1 to 4 mols per mol of said nitrile in the presence of a catalytic amount of sulfur, and recovering said mercapto-substituted nitrile product from the resulting reaction mixture.

2. The process according to claim 1, wherein said reaction is carried out in the presence of a catalytic amount of an organic base having an ionization constant of less than $1 \times 10^{-5}$.

3. A process for preparing 3-mercaptopropionitrile, which comprises reacting at autogenous pressures and between a temperature range of 0 to 150° C. 1 mol of acrylonitrile with 2 mols of hydrogen sulfide in the presence of a catalytic amount of sulfur, and recovering 3-mercaptopropionitrile from the resulting reaction mixture.

4. The process according to claim 3, wherein said reaction is carried out in the presence of a catalytic amount of an organic base having an ionization constant of less than $1 \times 10^{-5}$.

5. The process according to claim 3, wherein the amount of sulfur employed is in the range of 0.1 to 5 grams per mole of said acrylonitrile reactant.

6. The process according to claim 3, wherein the amount of sulfur employed and the amount of said organic base employed are both in the range of 0.1 to 5 grams per mole of said acrylonitrile reactant.

7. The process according to claim 6, wherein said organic base is 2-methyl-5-ethylpyridine.

References Cited by the Examiner

UNITED STATES PATENTS 2,163,176  6/1939  Keyssner _____ 260—465 X

OTHER REFERENCES

Naylor, Journal of Polymer Science, vol. 1, 1946, pages 305–309.

Reid, Organic Chemistry of Bivalent Sulfur, vol. 1, 1958, pages 18–21.

CHARLES B. PARKER, *Primary Examiner.*

JOSEPH P. BRUST, *Assistant Examiner.*

UNITED STATES PATENT OFFICE
CERTIFICATE OF CORRECTION

Patent No. 3,280,163

October 18, 1966

Rector P. Louthan et al.

It is hereby certified that error appears in the above numbered patent requiring correction and that the said Letters Patent should read as corrected below.

Column 5, line 34, before "said hydrogen sulfide" insert -- with hydrogen sulfide, --.

Signed and sealed this 5th day of September 1967.

(SEAL)
Attest:

ERNEST W. SWIDER
Attesting Officer

EDWARD J. BRENNER
Commissioner of Patents